United States Patent
Guo et al.

(10) Patent No.: US 8,352,617 B2
(45) Date of Patent: *Jan. 8, 2013

(54) METHOD AND SYSTEM FOR DATA PROCESSING

(75) Inventors: Ming Liang Guo, Beijing (CN); Deyu Wang, Beijing (CN); Wei Lei Wu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 385 days.

This patent is subject to a terminal disclaimer.

(21) Appl. No.: 12/625,817

(22) Filed: Nov. 25, 2009

(65) Prior Publication Data

US 2010/0138544 A1    Jun. 3, 2010

(30) Foreign Application Priority Data

Nov. 28, 2008   (CN) .......................... 2008 1 0179465

(51) Int. Cl.
  *G06F 15/16* (2006.01)
(52) U.S. Cl. ...................................... 709/227; 709/221
(58) Field of Classification Search ................... 709/213
  See application file for complete search history.

(56) References Cited

U.S. PATENT DOCUMENTS

| | | | | |
|---|---|---|---|---|
| 2005/0138421 A1* | 6/2005 | Fedronic et al. | ............ | 713/201 |
| 2007/0244987 A1* | 10/2007 | Pedersen et al. | ............ | 709/217 |

OTHER PUBLICATIONS

O'Reilly and Associates, "Web Database Applications With PHP & MYSQL: Hypertext Transfer Protocol" HTTP://HELL.ORG.US/DOCS/OREILLY/WRBPROG/WEBDB/APPB_02.HTM, 2003, pp. 1-13.

F. Faruqui, "Introduction to Interprocess Communication Using Named Pipes" HTTP://DEVELOPERS.SUN.COM/SOLARIS/ARTICLES/NAMED_PIPES.HTML, Jul. 2002, pp. 1-8.

T. Alcott et al., "Failover and Recovery in Websphere Application Server Advanced Edition 4.0" Dec. 18, 2001, pp. 1-113.

"Named Pipes" Document Printed Jan. 7, 2008, pp. 1-5.

* cited by examiner

*Primary Examiner* — Wing F Chan
*Assistant Examiner* — Andrew Woo
(74) *Attorney, Agent, or Firm* — Law Office of Jim Boice (57) ABSTRACT

A computer-implemented method, system and computer program product for protecting data being transferred during a session with an application are presented. In response to receiving a session request that includes an application identifier for an application, a data processing node establishes a session with the application and assigns a session identifier for that session. A session response, which includes the session identifier, to the session request is sent. In response to receiving a first request that includes the session identifier, a first pipe in the session is established. This first pipe enables data related to the first request to be isolated according to an assigned first pipe identifier for the first pipe. A first response to the first request is sent, wherein the first response comprises the session identifier and the first pipe identifier.

15 Claims, 5 Drawing Sheets

METHOD AND SYSTEM FOR DATA PROCESSING

BACKGROUND

The present disclosure relates to data communication, and particularly to session based data processing. Still more particularly, the present disclosure relates to protecting data being transferred during a session.

BRIEF SUMMARY

A computer-implemented method, system and computer program product for protecting data being transferred during a session with an application are presented. In response to receiving a session request that includes an application identifier for an application, a data processing node establishes a session with the application and assigns a session identifier for that session. A session response, which includes the session identifier, to the session request is sent. In response to receiving a first request that includes the session identifier, a first pipe in the session is established. This first pipe enables data related to the first request to be isolated according to an assigned first pipe identifier for the first pipe. A first response to the first request is sent, wherein the first response comprises the session identifier and the first pipe identifier.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Open System Interconnect (OSI) model is a standard established by International Standardization Organization (ISO) for network communication. An open system includes a suite of protocols that allows two different systems to communicate independent of underlying architecture. A protocol defined by a specific vendor makes it impossible to communicate between independent systems. The purpose of OSI model is to enable communication between different systems without changing the software and hardware logical structure of the systems. The OSI model is not a suite of protocols; rather, it is a model used to understand and design flexible, robust and interoperable network architecture.

To establish network systems that enable communication with each other between various types of computer systems, the OSI model has provided a hierarchical framework for network system design. It contains seven layers that are independent with each other but are interrelated with each other, each of which defines a portion of function that passes information through network. These seven ordered layers include physical layer, data link layer, network layer, transport layer, session layer, presentation layer and application layer.

The physical layer includes those functions required to transmit bits on physical media. The physical layer defines mechanical and electrical characters of interface and transport media, and also defines procedure and function that have to be performed by physical device and interface for transmission. The data link layer turns data transport channel that is made no change by the physical layer into a reliable link and is responsible for node-to-node transmission. Thus, data of the physical layer can be transmitted to the network layer without error. The network layer is responsible for passing packets from source address to destination address via network.

The transport layer is responsible for the procedure of passing entire message form source end to destination end (end to end). The session layer is a dialogue controller for network, and it establishes and maintains and synchronizes interactive operations of communication system. The presentation layer is used to define semantic and syntax for interchanging information between two systems. The application layer enables a user to access network, and it can provide user interface and service support, such as e-mail, remote file access and transmission, shared database management and other information service.

The user on a network communicates daily via a computer network, receives and sends a large amount of information in order to perform commercial interaction. The above mentioned standard was established many years ago. With the rapid development of electronic technology, there is explosive growth in computer network, particularly, in performance and capacity of Internet. The bandwidth for network transmission can already support the need of large capacity data transmission, and network transmission is no longer a bottleneck. The network transmission provides space for requesting node and responding node to process service in parallel, so that requesting node and responding node can focus on service processing. Thus, the enhancement in performance of data processing node has made it necessary to improve the Open System Interconnect (OSI) model based transport protocol. For instance, often there is a need to transport data between HTTP requests when developing a Web application. The conventional method will typically use the dialogue management capability of a Web server or an application server to accomplish data transmission between HTTP requests. First, in one HTTP request, data is put into a session for which a unique identifier is set. Then, in another HTTP request, shared data is invoked through unique identifier of session. This mechanism allows commercial application logic to pass data parameters between multiple HTTP requests. However, chaos may arise in the session when multiple HTTP requests arise concurrently or need to be isolated respectively. The shortcoming in prior art which has been found by the inventor of the present invention will be described below in conjunction with FIG. 1.

Figure 1:
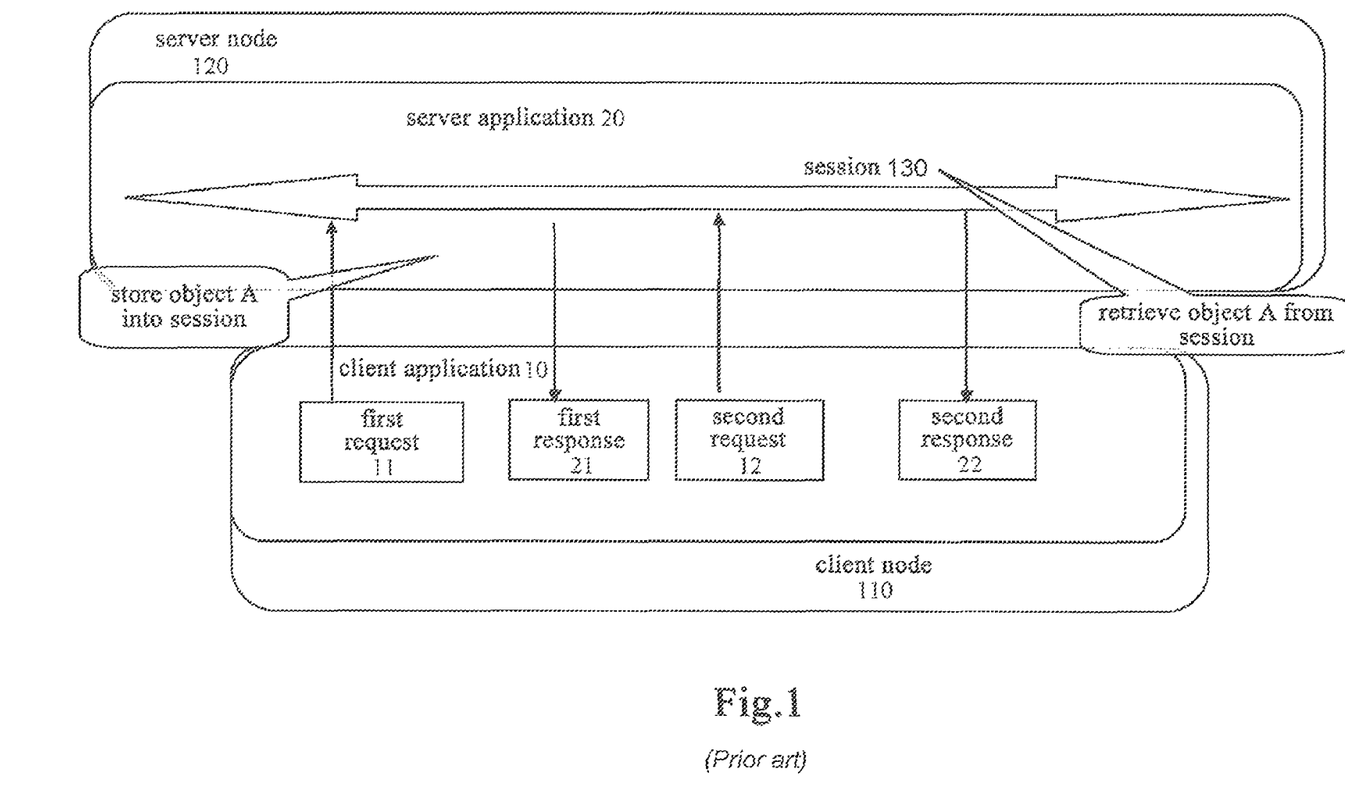
FIG. 1 depicts a diagram of performing data communication via a session in prior art.

FIG. 1 depicts a diagram of performing data communication via a session in the prior art, in which a client node 110 and a server node 120 are shown to share data at server node 120 via session 130. The client node 110 includes a client application 10 and the server node 120 includes a server application 20. Communication is performed between the client node 110 and the server node 120, and connections for physical layer, data link layer, network layer and transport layer are established. There is a plurality of methods for establishing such connections in prior art and they are not described here for brevity.

Based on a first client request from client application 10 to server application 20, on transport layer connection, the client node 110 sends to the server node 120 a first request 11 that generally includes a username and user type.

In response to that first request 11, the server node 120 establishes a session 130 and assigns a session identifier for that session. The server node 120 can assign server-side session storage space for session 130.

Based on a first service response from the server application 20 to the client application 10, the server node 120 sends a first response 21 to the first request 11 back to the client node 110, and the first response includes the session identifier. The client node 110 can also correspondingly assign client-side session storage space for session 130.

Thereafter, the server node 120 communicates with the client node 110 via session 130 and shares data by using session 130. If the client node 110 (based on a second client request from client application 10 to server application 20) sends a second request 12 to the server node 120, and the second request 12 includes the session identifier, username and user type, and can also include an object A. After receiving the second request 12, the server node 120 stores the object A in the above server-side session storage space. After the server application 20 has finished processing the second request 12, the server node sends a second response 22 to the second request back to the client node 110 via session 130.

At this point, the object A still exists in session 130, until the server node 120 removes the object A (if the server application 20 removes the object A) or the object A will be automatically deleted when the session is released. The server application 20 of server node 120 shares the stored object A within all of the request and response sequences via session 130. Object A can be retrieved from session when the server application 20 of server node 120 needs to process the object A. Thus, communication and data share between the server node 120 and the client node 110 via session is achieved.

However, if after establishing a session, the above requesting client node and server node need to simultaneously process a plurality of similar requests A, B and C, which are used for different user account information processing, then chaos may arise in the session when multiple HTTP requests arise concurrently or need to be isolated respectively, and account information of different user may overlap with each other.

The present invention is described below. Each block of the flowchart and/or block diagram and combination of blocks in flowchart and/or block diagram can both be implemented by computer program instructions. These computer program instructions can be provided to processor of a general-purpose computer, a special-purpose computer or other programmable data processing apparatus so as to produce a machine, such that the instructions executed through the computer or other programmable data processing apparatus can create means for realizing the function/operation prescribed in the block of the flowchart and/or block diagram.

These computer program instructions can also be stored in a computer readable media that can instruct the computer or other programmable data processing apparatus to function in a particular manner, thus, the instructions stored in the computer readable media will create an article of manufacture that includes instruction means for realizing the function/operation prescribed in the block of the flowchart and/or block diagram.

Computer program instructions can also be loaded into computer or other programmable data processing apparatus, so that a series of operation steps are executed on the computer or other programmable data processing apparatus to create computer implemented process, such that the instructions executed on the computer or other programmable data processing apparatus provide the process for realizing the function/operation prescribed in the block of the flowchart and/or block diagram.

Figure 2A:
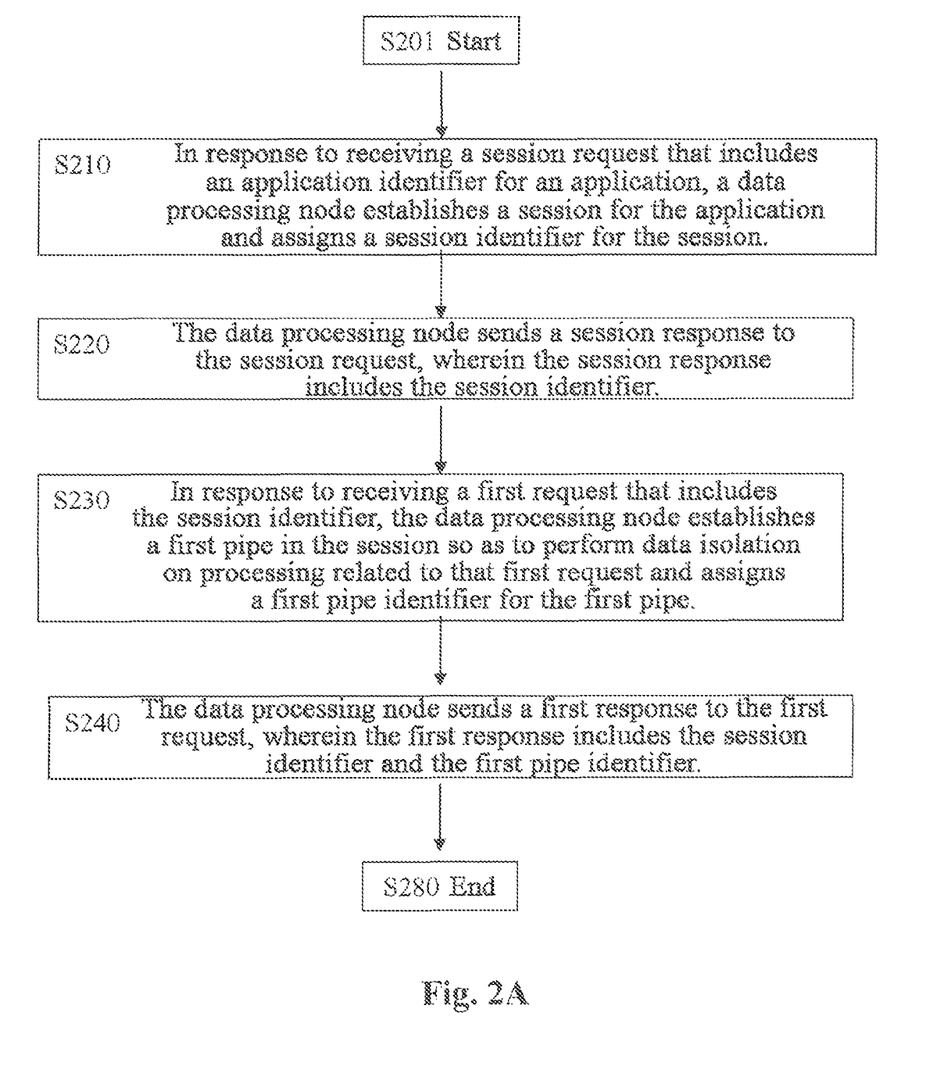
FIG. 2a depicts a flowchart of a data processing method in accordance with one embodiment of the present invention.

FIG. 2 depicts a flowchart of a data processing method in accordance with one embodiment of the present invention. Those skilled in the art will appreciate that the method can be used in situation in which multiple threads are processed concurrently in a same program or process, however, if the speed of serial processing can realize response to request (if the time limit for response can meets predetermined requirements), then serial processing is also applicable to the following method of the present invention. In that method, communication has been performed between data processing node (e.g., server node) and requesting node (e.g., client node), and connections for physical layer, data link layer, network layer and transport layer or connections with similar functions have been established. The procedure and method for establishing the above connection is similar to that of the prior art and won't be described here in detail.

The transport layer is responsible for the procedure of passing entire message form source end to destination end (end to end). Although the network layer monitors the procedure of passing each packet from end to end, it does not know the interrelation between these packets. The network layer independently processes each packet as if it belongs to an independent message, regardless if it is actually true. The transport layer is responsible for ensuring that the entire message arrives at destination without error and in order, and performs error control and flow control at information source and information sink level. The function of application and presentation layer sometimes can be accomplished in a mixed layer. In this specification, the presentation function translation of the presentation layer will not be described for description convenience.

The hierarchy of Transmission Control Protocol/Internet Protocol (TCP/IP) protocol family is not strictly corresponding to the hierarchy of an OSI model. The TCP/IP protocol family is comprised of five layers: physical layer, data link layer, network layer, transport layer and application layer. The former four layers provide physical interface, network interface, internetwork connection and transport function, and these layers correspond to the former four layers of an OSI model. The most upper three layers of an OSI model are as a separate layer in the TCP/IP protocol family, which is called application layer. The application layer provides functions of the most upper three layers of an OSI model.

The service provided by the former three layers of OSI (physical layer, data link layer and network layer) is not needed by some processes. The session layer is a dialogue controller of network, it establishes and maintains and synchronizes interactive operations of communication system. The session layer provides dialogue control and allows two systems to enter a dialogue. This allows two processes to communicate there between in half duplex (one direction at a time) and full duplex (two directions at a time) manner. The session layer also provides synchronization. The session layer allows a process to add checkpoint (synchronization point) in a data flow. For instance, assume a system is transferring a file with 800 pages, checkpoint should be inserted appropriately after each 100 pages in order to make confirmation independently upon reception of each 100 pages. In this case, if a crash occurs when transferring page 523, then retransmission will be started at page 501, and page 1-500 need not to be retransmitted.

Those skilled in the art will appreciate that the data processing method of the embodiment shown in FIG. 2 is applicable to OSI based transport layer connection, and is also applicable to TCP/IP protocol family based and other similar transport layer connection.

The data processing method shown in FIG. 2 comprises the following steps. It starts at step S201. At step S210, in response to receiving a session request that includes an application identifier for an application, a data processing node establishes a session for the application so as to perform data share between processing related to the session, and assigns a session identifier for the session. The method for establishing a session in that step is similar to the method in FIG. 1, except that, in subsequent steps, the data processing node will further establish a pipe in the session.

At step S220, the data processing node sends a session response to the session request, wherein the session response includes the session identifier. Thus, the data processing node can communicate with the requesting node (such as a client node) via the established session. Moreover, the data processing node performs data sharing on processing related to the session. In the present invention, the processing related to a session is relative to the processing related to a pipe. The processing related to a session refers to processing that may be related to the entire session, and processed data or data resulting from the processing may be shared in the session and shared among all pipes of the session. The processing related to a pipe means that processed data or data resulting from the processing may only be shared in that pipe and is isolated from other pipes. The processing related to a specific request means that processed data or data resulting from the processing may only be shared in a pipe related to that specific request and is isolated from other pipes. For instance, when a client node communicates with a server node, username and data of user permission obtained from processing user request saved in the session by the server node can be shared in the session and shared among all pipes of the session. For a first specific request in a first pipe, permission authentication can be performed on username and data of user permission in the session and the first specific request is processed based on the authentication result. The data in the first specific request and the data obtained from processing the first specific request may only be shared in that first pipe; that is, data in the first pipe is shared between processing related to the first specific request. While for a second specific request in a second pipe, permission authentication can also be performed on username and data of user permission in the session and the second specific request is processed based on the authentication result. The data in the second specific request and the data obtained from processing the second specific request may only be shared in that second pipe; that is, data in the second pipe is shared between processing related to the second specific request.

At step S230, in response to receiving a first request that includes the session identifier, the data processing node establishes a first pipe in the session so as to perform data isolation on processing related to that first request and assigns a first pipe identifier for the first pipe. This step establishes an isolation mechanism in the session. Wherein, the data processing node can establish a pipe for each application that has made a request to it, so as to support multiple concurrent requests that may be sent by that application. The application for which a pipe needs to be established can also be determined in advance. Thus, the data processing node can establish the first pipe in response to the first request based on the application identifier.

According to another embodiment of the invention, the first request can also include a request to establish a pipe, so as to establish a pipe for the request to establish a pipe, and does not establish a pipe but use session for the request that does not carry a pipe identifier and has made no request to establish a pipe.

At step S240, the data processing node sends a first response to the first request, wherein the first response includes the session identifier and the first pipe identifier.

In this way, the data processing node can communicate with a requesting node (such as a client node) via established session and the first pipe therein. And the data processing node performs data isolation on processing related to the first request (such as processing on subsequent request resulted from the first request). This step can establish a first pipe in the session based on processing needs of data processing node or upon request (e.g., isolation needs to be performed on a request issued by a thread of a requesting client application and a request issued by other thread). Thereafter, data isolation will be performed on processing related to the first request via the first pipe.

At step S280, the method ends. In contrast to the prior art, the above method establishes a pipe mechanism with isolation function.

Figure 2B:
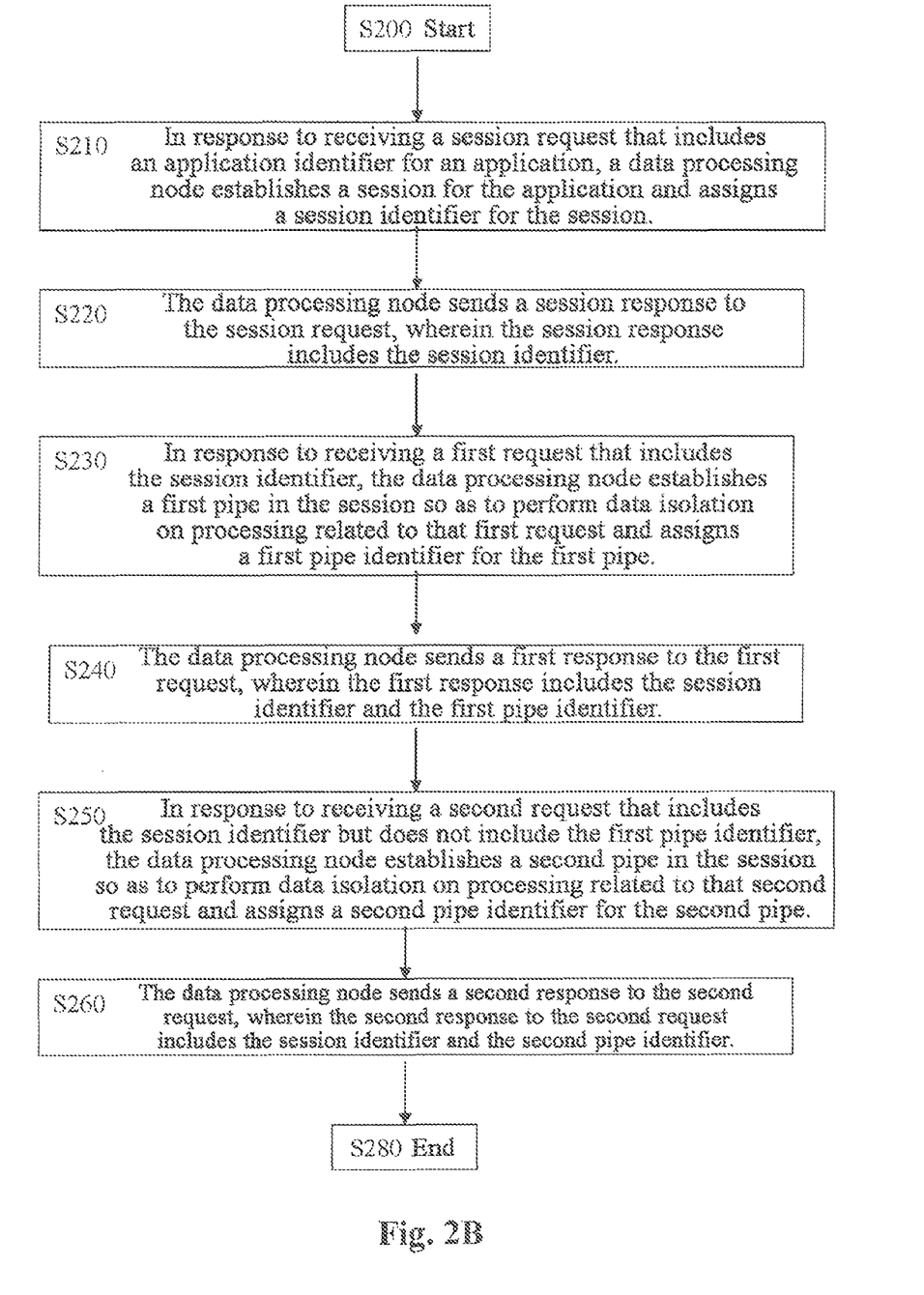
FIG. 2b depicts a flowchart of a data processing method in accordance with another embodiment of the present invention.

FIG. 2b depicts a flowchart of a data processing method in accordance with another embodiment of the present invention. In comparison with the method shown in FIG. 2a, the method of FIG. 2b further comprises step 250 and step 260. At step 250, in response to receiving a second request that includes the session identifier but does not include the first pipe identifier, the data processing node establishes a second pipe in the session so as to perform data isolation on processing related to that second request and assigns a second pipe identifier for the second pipe. Similar to establish the first pipe, the purpose of establishing a second pipe is to perform data isolation on processing related to that second request via the second pipe. At step 260, the data processing node sends a second response to the second request, wherein the second response includes the session identifier and the second pipe identifier. Thus, according to the method of FIG. 2b, data in the session but outside the pipe is shared between processing related to the session, data is shared via the first pipe between processing related to the first request, and data is shared via the second pipe between processing related to the second request. The processing related to the first request and the processing related to the second request are isolated from each other, but they can share data in the session but outside the pipe.

Those skilled in the art can appreciate that the session request in the above embodiment can be issued separately, or the session request can be combined with the first request into a composite request and then issues the composite request.

The situation of issuing a composite request and processing of concurrent requests will be briefly analyzed below. In case of multiple threads are used for concurrent processing in a same requesting application, each of the multiple threads can issue a request respectively. These requests can be issued concurrently, or be issued successively based on the need of thread processing. In case that the first request and second request are issued concurrently, such as a first thread of the client node issues the first request and a second thread of the client node issues the second request, at this time, both the first request and the second request contain a same application identifier. Accordingly, in response to the first request, the data processing node can establish a session and a first pipe in the session, and assign a session identifier for the session and a first pipe identifier for the first pipe; and in response to the second request, the data processing node can establish a second pipe in the session, and assign a second pipe identifier for the second pipe. In case that the first request and second request are issued successively, if the client node has not receive a response to the first request when the second request is issued, then the second request can include a same application identifier. In this case, the session and the first and second pipe therein can be established by using a method similar to the above method. In case that the first and second request are issued concurrently, if the client node has received a response to the first request when the second request is issued, then the second request can include the session identifier. In this case, the second request may or may not include an application identifier. The data processing node establishes a second pipe in the session and assigns a second pipe identifier for the second pipe.

Figure 3:
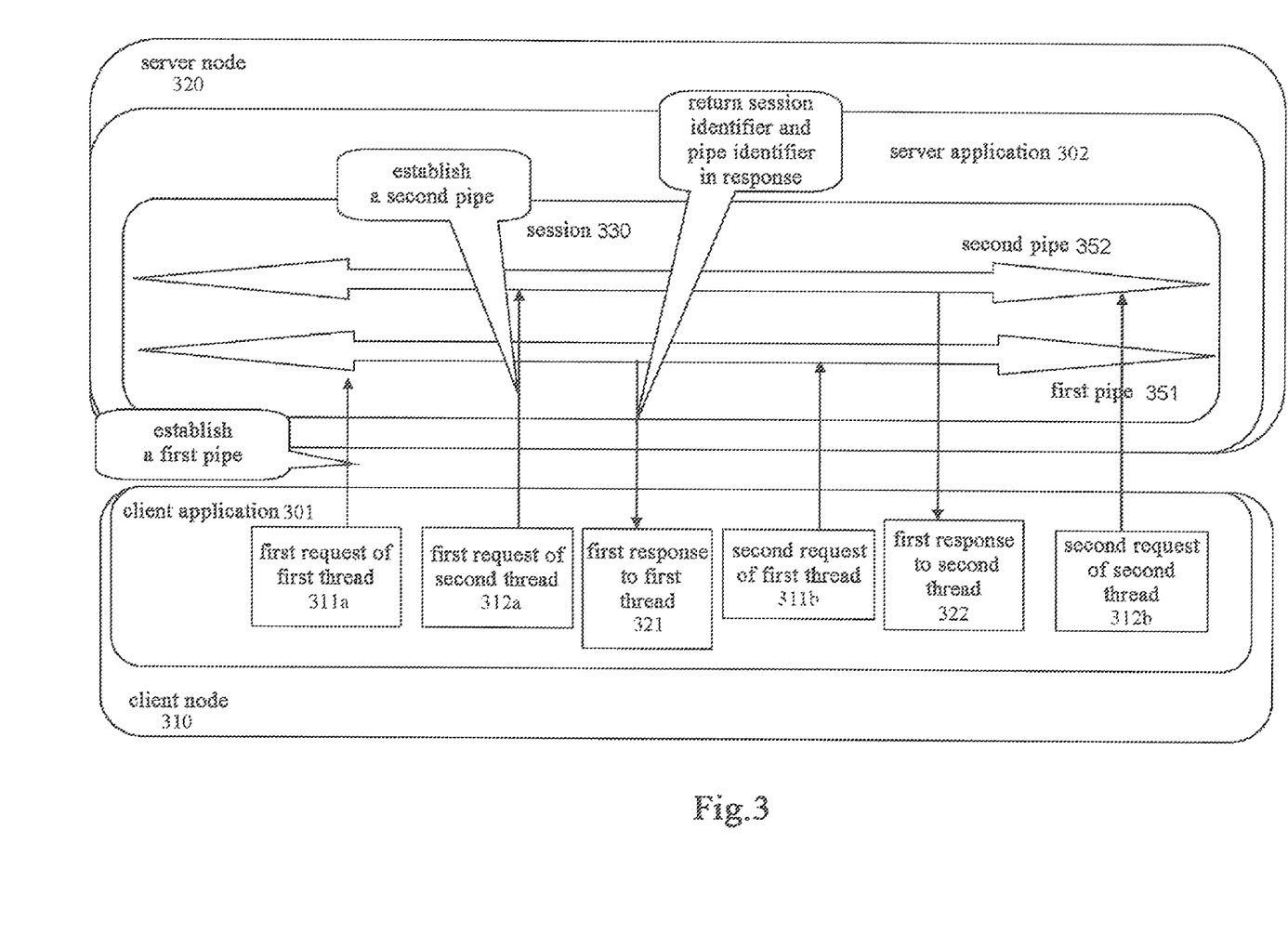
FIG. 3 depicts a diagram of performing communication between data processing nodes in accordance with another embodiment of the present invention.

FIG. 3 depicts a diagram of performing communication between data processing nodes in accordance with another embodiment of the present invention. Those skilled in the art will appreciate that the method shown in FIG. 3 is applicable to a situation in which multiple threads in a same application or process perform concurrent processing, however, if the speed of serial processing can realize response to request (if the time limit for response can meets predetermined requirements), then serial processing is also applicable to following method of the present invention. The two threads shown in the figure are for illustrative purpose rather than limitation. Those skilled in the art will appreciate that multiple threads can be included in the embodiment of FIG. 3.

FIG. 3 shows that server node 320 and client node 310 realize data sharing between multiple responses of multiple requests issued by a same thread via the pipe in the session. The client node 310 includes a client application 301, and the server node 320 includes a server application 302. The client application 301 includes multiple threads that run concurrently, each of which can independently issue a request to server application 302. The server application 302 is used to respond to the above requests respectively. The server application 302 can include multiple concurrently running threads for responding to the above requests respectively. Those skilled in the art will appreciate that, if the speed of serial processing of server application 302 on server node 320 can realize response to request (if the time limit for response can meets predetermined requirements), then serial processing is also applicable to following method of the present invention.

First, the server node 320 communicates with client node 310 and establishes connection for physical layer, data link layer, network layer and transport layer, or other connection with similar function. The procedure and method for establishing the above connection is similar to that of the prior art and won't be described here in detail.

After the connection for transport layer has been established, based on a session request made to server application 302 by client application 301, the session request includes an application identifier for an application, server node 320 establishes a session 330 so as to share data between processing related to session 330, and assigns a session identifier for session 330. The server node 320 sends a session response to the session request back to the client node 310, the session response includes the session identifier.

Based on a first request made to server application 302 by a first thread of client application 301, the client node 310 sends a first request 311a of the first thread to the server node 320. The first request 311a of the first thread may include the above session identifier, and may also include other attributes such as user type.

In response to receiving the first request 311a of the first thread, the server node 320 establishes a first pipe 351 in the session and assigns a first pipe identifier for the first request.

When establishing session 330, the server node 320 can assign session storage space for the session, and when establishing the first pipe, the server node 320 can assign first pipe storage space for the first pipe. The method of establishing a session in this step is similar to the method in FIG. 1. The difference is that the server node further establishes a first pipe 351 in the session.

Based on response to the first request 311a of the first thread by the server application 303, the server node 320 sends a first response 321 to the first thread of client node 310 to the client node 310. Wherein, the first response 321 to the first thread includes an identifier of the session 330 and an identifier of the first pipe 351. Thus, the server node 320 can communicate with the first thread of the client node 310 via the established session 330 and the first pipe 351 therein.

To improve processing efficiency, a second thread of the client application 301 can issue a request to the server application independent of the first thread, for instance, issue a first request of the second thread in parallel with the first request.

Based on another first request made to server application 302 by the second thread of the client application 301, the client node 310 sends a first request 312a of the second thread to the server node 320. The first request 312a of the second thread may include the session identifier or an identifier of the client application 301, and may also include application attributes such as user type.

In response to receiving the first request 312a of the second thread, the server node 320 establishes a second pipe 352 in the session 330 and assigns a second pipe identifier. When establishing the second pipe, the server node 320 can assign second pipe storage space for the second pipe.

Based on response to the first request 312a of the second thread by the server application 303, the server node sends a first response 322 to the second thread of client node 310 to the client node 310. Wherein, the response includes the identifier of the session 330 and an identifier of the second pipe 352. Thus, the server node 320 can communicate with the second thread of the client node 310 via the established session 330 and the second pipe 352 therein.

In communication between client application 301 of client node 310 and server application 302 of server node 320, the first and second thread of the client application 301 can use different transport layer ports, but the server application 302 of server node 320 can use a same transport layer port. The server node 320 may provide a transport layer port for the client application of client node 310. Different threads can establish different transport layer connections with the server application. Thus, the corresponding relationship between response and thread can be solved by the corresponding relationship of transport layer. For instance, the session request can be received and the session response can be sent on a first transport layer connection; the first request 311a of the first thread is received and the first response 321 to the first thread is sent on a second transport layer connection; and the first request 312a of the second thread is received and the first response 322 to the second thread is sent on a third transport layer connection.

Those skilled in the art can appreciate that the corresponding relationship between response and thread may also be solved by session layer. For instance, the session response may include the application identifier; the first request 311a of the first thread may further include an identifier of the first thread; the first request 312a of the second thread may further include an identifier of the second thread; the first response 321 to the first thread may further include an identifier of the first thread; the first response 322 to the second thread may further include an identifier of the second thread.

Therefore, a request may include client application identifier, thread identifier (or transport layer port identifier of thread), server application identifier of server node, and identifier of a same transport layer port used by a server application.

A response may include client application identifier, thread identifier (or transport layer port identifier of thread), server application identifier of server node, and identifier of a same transport layer port used by a server application.

In the method of FIG. 3, the server node 320 may assign session storage space for session 330, assign first pipe storage space for first pipe 351, and assign second pipe storage space for second pipe 352. Thus, the server node 320 may store data shared in session 330 in the session storage space; the server node 320 may store data that needs to be isolated in the first pipe storage space and the second pipe storage space, respectively. Data needs to be shared by first pipe 351 and second pipe 352 is stored in (or copied to) session storage space; data needs to be isolated is stored in corresponding pipe storage space, respectively.

Based on first response 321 to first thread, the client node 310 issues a second request 311b of the first thread to the server node 320. The second request 311b of the first thread includes the session identifier and the first pipe identifier, accordingly, the server node sends a second response (not shown) to the second request 311b of the first thread, wherein the second response includes the session identifier and the first pipe identifier. Wherein, the first request 311a of the first thread, the second request 311b of the first thread, the first response 321 to first thread and the second response to the first thread share the first pipe storage space.

Based on first response 322 to second thread, the client node 310 may issue a second request 312b of the second thread to the server node 320. The second request 312b of the second thread includes the session identifier and the second pipe identifier, accordingly, the server node sends a second response (not shown) to the second request 312b of the second thread, wherein the second response includes the session identifier and the second pipe identifier. Wherein, the first request 312a of the second thread, the second request 312b of the second thread, the first response 322 to second thread and the second response to the second thread share the second pipe storage space.

In this way, data in a session may be shared through the session identifier; data of the first pipe may be accessed through the session identifier and/or the first pipe identifier; data of the second pipe may be accessed through the session identifier and/or the second pipe identifier.

Corresponding to the above process of establishing session and pipe, the server node 320 may further perform process of releasing session and pipe so as to complete the communication. In particular, the server node 320 may release the first pipe, the second pipe and the session, if needed. The release process may employ active release and/or timeout release. For instance, the server node 320 can actively release the first pipe and its storage space after interaction with the first thread is completed. The second pipe and its storage space can be forced to release if the interaction between the server node 320 and the second thread has not completed after a predetermined time limit (such as set a predetermined lifetime), or if further interaction is not performed between the server node 320 and the second thread after a predetermined time limit (such as set a predetermined period).

According to another embodiment of the invention, the session request, the first and second request, and corresponding response can be sent via HTTP request.

According to another embodiment of the invention, the above method further comprises: the server node 320 determines the maximum number of pipes established in the session. The maximum number of pipes established in a session can be determined based on processing capability of the server node 320, or on processing capability (processing resource) allocated for a server or request node. For a request to further establish a new pipe in the session, if the number of previously established pipes has reached the maximum number of that pipe, then the request to establish a new pipe is denied, or the request to establish a new pipe will be placed into a waiting queue, a new pipe will be established after existing pipe has been released.

Although the method can be used situation in which multiple threads are processed concurrently in a same program or process, those skilled in the art will appreciate that if the speed of serial processing can realize real time response to request, then serial processing is also applicable to the above method of the present invention.

According to another embodiment of the invention, there is a bank in which a credit card management department (refers to as department A hereinafter) manages detailed user data of all credit card user, and another business expansion department (refers to as department B hereinafter) has a commercial intelligent application which analyzes user preference on using credit card by collecting user data of department A. Department B provides two HTTP requests for accomplishing data collection, that is, S1 and S2 respectively. To complete one data collection, S1 needs to be executed first and S2 needs to be executed later, department A will periodically run a program to provide information of new user to department B. To improve data processing efficiency, the program of department A will run concurrently. The procedure of interacting data by application program will be described in detail below. Wherein, process A is used to run process of data submission program for department A; process B is used to run process of data collection program for department B. Process B includes S1 and S2.

S1 is a HTTP service and the input of which is: username and user type, when invoked, it will execute the following program steps: create a HTTP session and temporally store username and user type into the HTTP session; access a commercial intelligent module for analyzing current user; return a HTTP response which includes a session identifier and a reply in XML format to invoker, the reply in XML format describes what information still needs to be provided by A.

S2 is another HTTP service and the input of which is: additional user information, when invoked, it will execute the following program steps: retrieve user data stored in HTTP session by S1; store new user information data (XML format) in a database along with retrieved user data in the HTTP session; and return a successful status to invoker.

The execution sequence of submitting data through single thread by process A is as follows. Process A constructs a HTTP request, the URL of which specifies the request invoke S1, the HTTP request includes username and user type and is sent to process B (this request does not include session identifier). Process B executes program segment corresponding to S1, a HTTP session is generated and assigned a session identifier, and username and user type is stored into current HTTP session. Process B sends corresponding HTTP response (include HTTP session identifier therein) to process A. Process A receives HTTP response and prepares additional user data according to requirement in XML. Process A constructs a second HTTP request, the URL of which specifies that the request invoke S2, the prepared data is sent to process B (this request includes session identifier). Process B executes program segment corresponding to S2, finds corresponding session buffer according to session identifier contained in the HTTP request, username and user type that is just stored is retrieved from the HTTP session for processing. A receives reply of B and ends successfully.

According to the prior art, the execution sequence of submitting data through two or more threads by process A may be as follows.

1. Process A generates two threads T1 and T2.
2. T1 constructs a HTTP request, the URL of which specifies the request invoke S1, the HTTP request includes username and user type and is sent to process B (does not include session identifier at this time).
3. Process B executes program segment corresponding to S1. A HTTP session is generated and assigned a session identifier and a session buffer, and username and user type is stored into current HTTP session. Process B sends corresponding HTTP response (includes HTTP session identifier therein) to process A.
4. T1 receives HTTP response and prepares additional user data according to requirement in XML (at this time, the session identifier is returned to process A).
5. T2 constructs a HTTP request, the URL of which specifies the request invoke S2, the HTTP request includes username and user type and is sent to process B (it will automatically carry the session identifier returned in step 4 at this time).
6. Process B executes program segment corresponding to S1, finds corresponding session buffer according to session identifier contained in the HTTP request submitted by T2, and stores username and user type submitted by T2 into current HTTP session. At this time, data stored into HTTP session at 3 will be overwritten, because T2 and T1 are in a same session. Process B sends corresponding HTTP response (includes HTTP session identifier therein) to process A.
7. T2 receives corresponding HTTP response and prepares additional user data according to requirement in XML.
8. T1 constructs a HTTP request to submit prepared data to S2.

9. Process B executes program segment corresponding to S2, and the retrieved username and user type here has been tampered at step 5.
10. T1 receives reply of B and ends successfully. Although ends successfully, error has occurred in actual data processing.
11. T2 constructs a HTTP request to submit prepared data to S2.
12. Process B executes program segment corresponding to S2. Here the retrieved username and user type is correct and is just the username and user type submitted by T2.
13. T2 receives reply of B and ends successfully.

In the above process according to the prior art, although T1 and T2 both end successfully, process B uses wrong username and user type at step 9. For process T1, error has occurred in actual data processing.

According to the following embodiment of the invention, the above situation is avoided by using a pipe mechanism in a session. A pipe can be viewed as a sub-session and the key difference with a session is a pipe identifier will not be shared by all of the threads of a client process.

S1: a HTTP service
Input is: username and user type.
When invoked, it will execute the following procedure steps.
  a1. Creates a pipe in a session, temporarily stores username and user type into the session (the session may be automatically created before the pipe is established).
  b1. Access a commercial intelligent module to analyze current user.
  c1. Returns a HTTP response that includes session identifier and pipe identifier and a reply in XML format to invoker, the reply in XML format describes what information still needs to be provided by A.

S2: another HTTP service
Input is: additional user information.
When invoked, it will execute the following procedure steps.
  a2. Retrieves data stored in pipe by S1.
  b2. Stores new user information data (xml format) into a database along with user data retrieved in a2 and releases the pipe.
  c2. Returns a successful status to invoker.

The execution situation in which process A submits data through two concurrently executing threads according to this embodiment of the invention is as follows.
1. Process A generates two threads T1 and T2.
2. T1 constructs a HTTP request, the URL of which specifies the request invoke S1, the HTTP request includes username and user type and is sent to process B (it neither includes session identifier nor pipe identifier at this time).
3. Process B executes program segment corresponding to S1. A HTTP session is generated and assigned a session identifier and a session buffer. A first pipe is established in the session and assigned a first pipe identifier, username and user type submitted by T1 is stored into that first pipe. Process B sends corresponding HTTP response (includes HTTP session identifier and the first pipe identifier therein).
4. T1 receives HTTP response and prepares additional user data according to requirement in XML (at this time, the session identifier is returned to process A, while the first pipe identifier is only in thread space of T1).
5. T2 constructs another HTTP request, the URL of which specifies the request invoke S1, the HTTP request includes username and user type and is sent to process B (it will automatically carry the session identifier returned in step 4 at this time, but without the pipe identifier).
6. Process B executes program segment corresponding to S1. Another new second pipe is created and username and user type submitted by T2 is stored into that second pipe. Process B sends corresponding HTTP response that includes the second pipe identifier to T2.
7. T2 receives HTTP response and prepares additional user data according to requirement in XML.
8. T1 constructs a HTTP request according to received response so as to submit prepared data to S2, wherein it carries its first pipe identifier.
9. Process B executes program segment corresponding to S2, processes data according to the first pipe identifier submitted by T1 to obtain correct processing result.
10. T1 receives reply of B and ends successfully.
11. T2 constructs a HTTP request according to received response so as to submit prepared data to S2, wherein it carries its second pipe identifier.
12. Process B executes program segment corresponding to S2, processes data according to the second pipe identifier submitted by T2 to obtain correct processing result.
13. T2 receives reply of B and ends successfully.

In the above embodiment of the invention, the mechanism of establishing pipe in a session realizes data isolation processing between requests of different threads in the session. In this way, space for concurrently processing service is provided for requesting node and responding node, so that the requesting node and responding node can focus on service processing. Two or more pipes can be established between the requesting node and responding node based on service processing capability.

Figure 4:
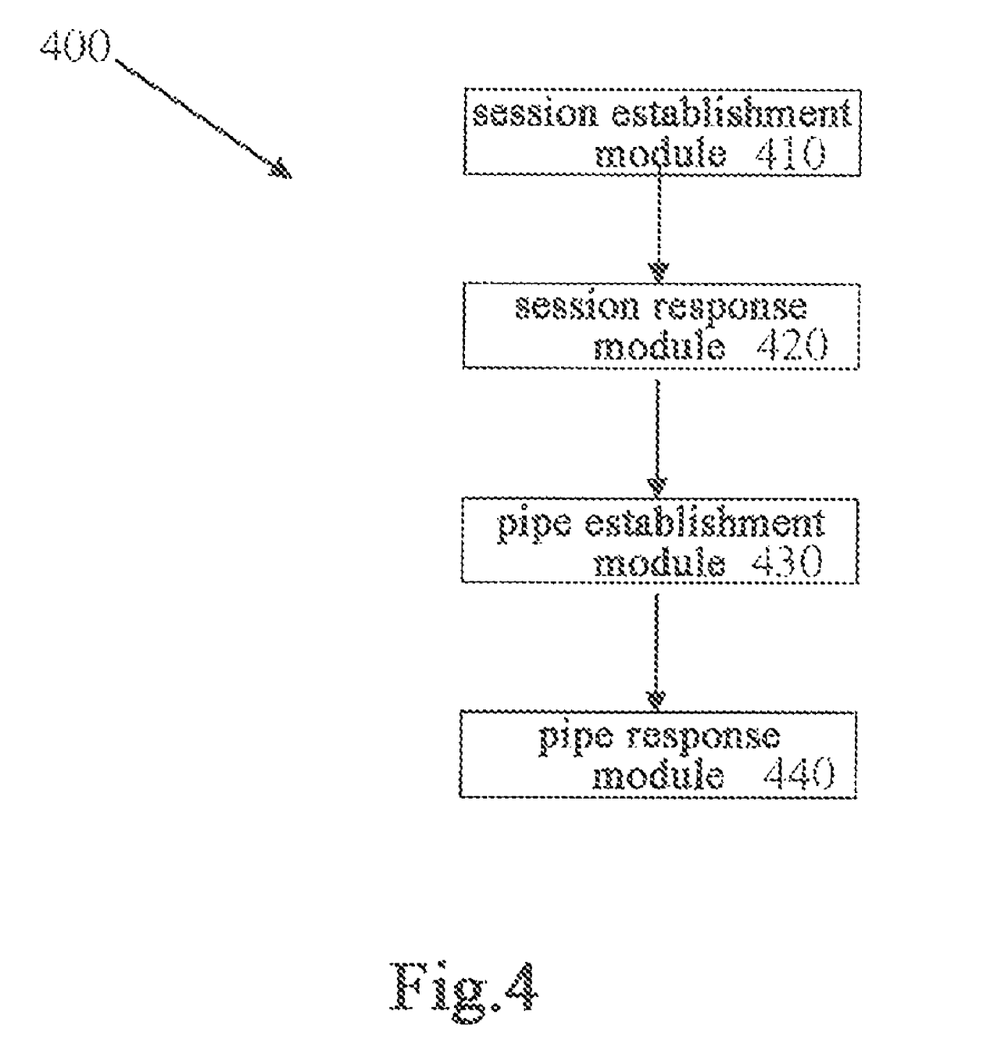
FIG. 4 depicts a system for data processing in accordance with another embodiment of the present invention.

FIG. 4 depicts a system for data processing in accordance with another embodiment of the present invention. According to this embodiment of the invention, the system for data processing comprises: a session establishment module 410 which, in response to receiving a session request that includes an application identifier for an application, establishes a session for the application and assigns a session identifier for the session; a session response module 420 for sending a session response to the session request, wherein the session response includes the session identifier; a pipe establishment module 430 which, in response to receiving a first request that includes the session identifier, establishes a first pipe in the session so as to perform data isolation on processing related to that first request and assigns a first pipe identifier for the first pipe; and a pipe response module 440 for sending a first response to the first request, wherein the first response includes the session identifier and the first pipe identifier.

According to a further embodiment of the invention, wherein, the pipe establishment module 430 is further configured to: in response to receiving a second request that includes the session identifier but does not include the first pipe identifier, establish a second pipe in the session so as to perform data isolation on processing related to that second request and assign a second pipe identifier for the second pipe; and the pipe response module 440 is further configured to send a second response to the second request, wherein the second response includes the session identifier and the second pipe identifier.

According to a further embodiment of the invention, wherein, the session request can be received and the session response can be sent on a first transport layer connection; the first request can be received and the first response can be sent on a second transport layer connection; and the second request can be received and the second response can be sent on a third transport layer connection.

According to a further embodiment of the invention, wherein, the session response can include the application identifier; the first request can further include an identifier of a first thread; the second request can further include an identifier of a second thread; the first response can further include an identifier of the first thread; the second response can further include an identifier of the second thread.

According to a further embodiment of the invention, wherein, the session establishment module 410 can assign session storage space for the session; the pipe establishment module 430 can assign first pipe storage space for the first pipe, and assign second pipe storage space for the second pipe.

According to a further embodiment of the invention, wherein, data in a session can be shared through the session identifier; data of the first pipe can be accessed through the session identifier and/or the first pipe identifier; data of the second pipe can be accessed through the session identifier and/or the second pipe identifier.

According to a further embodiment of the invention, the system further comprises a pipe release module for releasing the first pipe and releasing the second pipe; and a session release module for releasing the session.

According to a further embodiment of the invention, wherein the session request, the first request, the second request, and corresponding responses can be sent via HTTP request.

According to a further embodiment of the invention, wherein, data shared in the session can be stored in the session storage space; data that needs to be isolated can be stored in the first pipe storage space and the second pipe storage space, respectively.

According to a further embodiment of the invention, wherein, the pipe response module 440 is further configured to: in response to receiving a third request that includes the session identifier and the first pipe identifier, sends a third response to the third request, wherein the third response includes the session identifier and the first pipe identifier.

According to a further embodiment of the invention, wherein, the pipe response module 440 is further configured to: in response to receiving a third request that includes the session identifier and the first pipe identifier, sends a third response to the third request, wherein the third response includes the session identifier and the first pipe identifier; wherein, the third request, the third response and the first request, the first response share first pipe storage space.

The invention also provides a storage media or signal carrier embodying instructions for carrying out the method according to the present invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Having thus described embodiments of the invention of the present application in detail and by reference to illustrative embodiments thereof, it will be apparent that modifications and variations are possible without departing from the scope of the invention defined in the appended claims.

The invention claimed is:

1. A computer program product comprising a computer readable storage device embodied therewith, the computer readable storage device comprising:
    computer readable program code configured to establish a session between a first application in a first data processing node and a second application in a second data processing node, wherein said session is established in response to a session request that comprises an application identifier for the first application;
    computer readable program code configured to assign a session identifier for said session;
    computer readable program code configured to send a session response to said session request, wherein said session response comprises said session identifier;
    computer readable program code configured to establish a first pipe in said session to perform data isolation on processing related to a first request, wherein said first pipe is a communication path between a first process and a second process, wherein the first process is a first thread in the first application and the second process is a first thread in the second application, wherein said first pipe is isolated from other pipes in the session, and wherein said first pipe is established in response to said first data processing node receiving said first request that comprises said session identifier;
    computer readable program code configured to assign a first pipe identifier for said first pipe;
    computer readable program code configured to send a first response to said first request, wherein said first response comprises said session identifier and said first pipe identifier;
    computer readable program code configured to establish a second pipe in said session to perform data isolation on processing related to a second request, wherein said second pipe is a communication path between a second thread in the first application and a second thread in the second application, and wherein the first pipe and the second pipe operate concurrently during the session;
    computer readable program code configured to assign a second pipe identifier for said second pipe, wherein said second pipe is established in response to said first data processing node receiving said second request that comprises said session identifier but does not comprise said first pipe identifier;
    computer readable program code configured to use the session identifier to identify the first pipe and the second pipe as being sub-sessions of the session; and
    computer readable program code configured to send a second response to said second request, wherein said second response comprises said session identifier and said second pipe identifier.

2. The computer program product of claim 1, wherein said session request is received and said session response is sent on a first transport layer connection, wherein said first request is received and said first response is sent on a second transport layer connection, wherein said session request and said first request are received concurrently at the first data processing node, and wherein said second request is received and said second response is sent on a third transport layer connection.

3. The computer program product of claim 2, wherein data in a session is shared through said session identifier, wherein data of said first pipe is accessed through said session identifier and said first pipe identifier, and wherein data of said second pipe is accessed through said session identifier and said second pipe identifier.

4. The computer program product of claim 1, wherein said session response further comprises said application identifier, wherein said first request further comprises an identifier of the first thread in the first application, wherein said second request further comprises an identifier of the second thread in the first application, wherein said first response further comprises the identifier of said first thread in the first application, and wherein said second response further comprises the identifier of said second thread in the first application.

5. The computer program product of claim 1, wherein said session request and said first request are received on a first transport layer connection, wherein said session response and said first response are sent on said first transport layer connection, and wherein said second request is received and said second response is sent on a second transport layer connection.

6. The computer program product of claim 1, wherein said first data processing node assigns session storage space for said session, wherein said first data processing node assigns first pipe storage space for said first pipe, and wherein said first data processing node assigns second pipe storage space for said second pipe.

7. The computer program product of claim 6, wherein said first data processing node stores data shared in said session in said session storage space, wherein said first data processing node stores a first set of data, which has been selected for isolation, in said first pipe storage space, and wherein said first data processing node stores a second set of data, which has also been selected for isolation, in said second pipe storage space.

8. The computer program product of claim 1, further comprising:
computer readable program code configured to send, by said first data processing node, a third response to a third request, wherein said third response comprises said session identifier and said first pipe identifier, and wherein said third response is sent in response to said first data processing node receiving the third request that comprises said session identifier and said first pipe identifier.

9. The computer program product of claim 8, further comprising:
computer readable program code configured to send, by said first data processing node, said third response to said third request, wherein said third response is sent in response to said first data processing node receiving said third request that comprises said session identifier and said first pipe identifier, wherein said third response comprises said session identifier and said first pipe identifier, and wherein said third request, said third response, said first request and said first response share said first pipe storage space.

10. The computer program product of claim 1, further comprising:
computer readable program code configured to actively release said first pipe, wherein said active release allows said first pipe to be used by other data requests.

11. The computer program product of claim 1, further comprising:
computer readable program code configured to timeout release said first pipe, wherein said timeout release allows other data requests to use said first pipe after a timeout period expires.

12. The computer program product of claim 1, wherein said first data processing node establishes said first pipe in response to said first request based on said application identifier.

13. The computer program product of claim 1, wherein said first request comprises a request to establish a pipe.

14. The computer program product of claim 1, further comprising:
computer readable program code configured to determine, by said first data processing node, a maximum number of pipes that are permitted to be established in said session.

15. A computer system comprising:
a central processing unit; and
a computer readable memory coupled to the central processing unit, wherein the computer readable memory comprises software that, when executed, causes the central processing unit to implement:
establishing a session between a first application in a first data processing node and a second application in a second data processing node, wherein said session is established in response to a session request that comprises an application identifier for the first application;
assigning a session identifier for said session;
sending a session response to said session request, wherein said session response comprises said session identifier;
establishing a first pipe in said session to perform data isolation on processing related to a first request, wherein said first pipe is a communication path between a first process and a second process, wherein the first process is a first thread in the first application and the second process is a first thread in the second application, wherein said first pipe is isolated from other pipes in the session, and wherein said first pipe is established in response to said data processing node receiving said first request that comprises said session identifier;
assigning a first pipe identifier for said first pipe;
sending a first response to said first request, wherein said first response comprises said session identifier and said first pipe identifier;
establishing, by said first data processing node, a second pipe in said session to perform data isolation on processing related to a second request, wherein said second pipe is a communication path between a second thread in the first application and a second thread in the second application, and wherein the first pipe and the second pipe operate concurrently during the session;
assigning a second pipe identifier for said second pipe, wherein said second pipe is established in response to said first data processing node receiving said second request that comprises said session identifier but does not comprise said first pipe identifier;
using the session identifier to identify the first pipe and the second pipe as being sub-sessions of the session; and
sending, by said first data processing node, a second response to said second request, wherein said second response comprises said session identifier and said second pipe identifier.

* * * * *